United States Patent [19]

Tagawa et al.

[11] Patent Number: 4,772,945

[45] Date of Patent: Sep. 20, 1988

[54] SURVEILLANCE SYSTEM

[75] Inventors: Susumu Tagawa, Kanagawa; Hiromi Okitsu, Tokyo, both of Japan

[73] Assignee: Sony Corporation, Tokyo, Japan

[21] Appl. No.: 48,618

[22] Filed: May 11, 1987

[30] Foreign Application Priority Data

May 13, 1986 [JP] Japan ................................ 61-109270

[51] Int. Cl.[4] ................................................ H04N 7/18

[52] U.S. Cl. ..................................... 358/108; 358/105

[58] Field of Search ........................ 358/105, 108, 181; 340/541, 518

[56] References Cited

U.S. PATENT DOCUMENTS

| | | | |
|---|---|---|---|
| 4,257,063 | 3/1981 | Loughry et al. | 358/108 |
| 4,337,481 | 6/1982 | Mick et al. | 358/105 |
| 4,511,886 | 4/1985 | Rodriguez | 358/108 X |
| 4,630,110 | 12/1986 | Cotton et al. | 358/108 |
| 4,673,974 | 6/1987 | Ito et al. | 358/108 |
| 4,679,077 | 7/1987 | Yuasa et al. | 358/108 |

FOREIGN PATENT DOCUMENTS

| | | | |
|---|---|---|---|
| 2150724 | 7/1985 | United Kingdom | 358/108 |

*Primary Examiner*—Howard W. Britton

*Assistant Examiner*—Victor R. Kostak

*Attorney, Agent, or Firm*—Hill, Van Santen, Steadman & Simpson

[57] ABSTRACT

A surveillance system having self-test functions having an image pick-up sensor, an image processing unit connected to the image pick-up sensor for detecting a scene change of video signals obtained from the image pick-up sensor, an alarm generator connected to the image processing unit for generating alarm signals based on the detection of the scene change, and a self-tester including noise signals to be superimposed on the video signals to be supplied to the image processing unit as a quasi-scene change information.

5 Claims, 5 Drawing Sheets

SURVEILLANCE SYSTEM

BACKGROUND OF THE INVENTION

1. Field of the Invention

This invention relates to a surveillance apparatus using a television camera.

2. Description of the Prior Art

Conventional surveillance apparatus detects abnormalities by the use of infrared rays. However, when an abnormality is detected by such a surveillance apparatus, the cause of the abnormality is not revealed unless one goes to the site of the abnormality. Another inconvenience with this kind of surveillance apparatus is that there is no residual proof of a detected abnormality.

To overcome such inconveniences, there has also been proposed a surveillance apparatus using a television camera and a monitoring apparatus.

Nevertheless, such a conventional surveillance apparatus using a television camera and the monitoring apparatus needs a supervising person who surveys the apparatus. Further, as to such an apparatus that uses a long-time playing video tape record (VTR), the VTR records at intervals, so that the VTR may not record an important scene. Further, since abnormalities rarely happen, an abnormality may happen when the camera-VTR apparatus is out of order and does not operate.

OBJECTS AND SUMMARY OF THE INVENTION

Accordingly, it is the principal object of the present invention to provide a surveillance apparatus which is capable of removing the above-mentioned defects and particularly assuring complete operations thereof.

To achieve the above object, the present invention provides a surveillance apparatus having self-test functions, comprising an image pick-up device, an image processing device connected to the image pick-up device for detecting a scene change in the video signals obtained from the image pick-up device; and alarm device connected to the image processing device for generating alarm signals based on the detection of the scene change; and a self-test device including a source of noise signals which are superimposed on the video signals to be supplied to the image processing means as a quasi-scene change information.

These and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

An embodiment of a surveillance apparatus according to the present invention will hereinafter be described with reference to FIG. 1.

Figure 1:
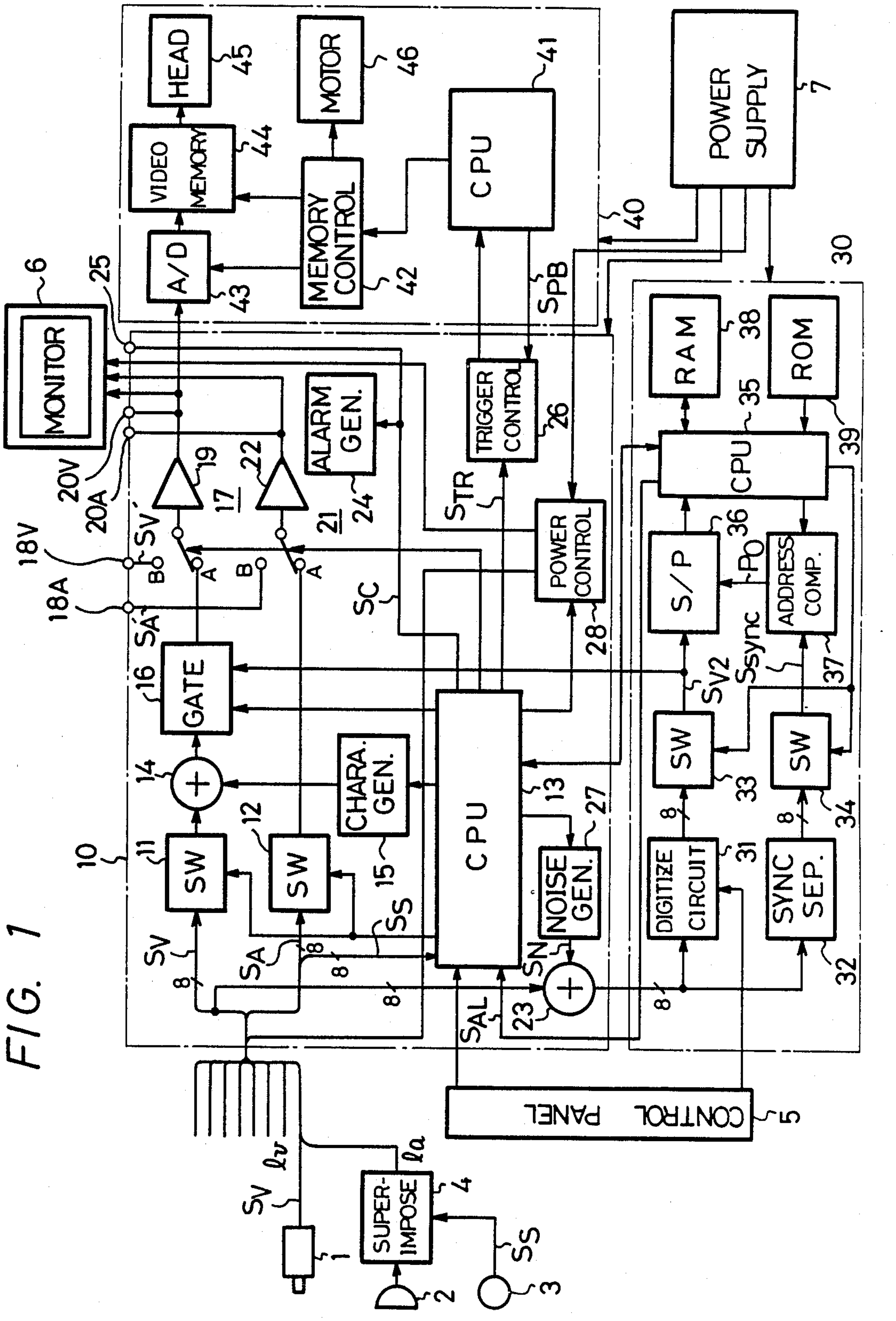
FIG. 1 is a block diagram schematically showing a circuit configuration of an embodiment of a surveillance apparatus according to the present invention.

In FIG. 1, reference numeral 1 designates a television (TV) camera which outputs a video signal Sv through a line lv to a switching circuit 11 in a switcher section 10. Reference numeral 2 designates a microphone attached to the television camera 1, and 3 designates a known sensor using infrared rays or the like. A signal Ss (a direct current signal) detected and outputted from the sensor 3 is superimposed on an audio signal $S_A$ ouputted from the microphone 2 by a superimposing circuit 4. An output signal from the superimposing circuit 4 is supplied to the switcher section 10 through a line 1*a*. In the switcher section 10, the audio signal $S_A$ from the microphone 3 is supplied to a switching circuit 12 and the direct current detecting signal Ss is supplied to an alarm input terminal of a central processing unit (CPU) 13.

FIG. 1 shows only one set of sensors including the TV camera 1, the microphone 2 and the sensor 3, for one channel. However, 8 such sets are provided, 1 for 8 channels which are connected to the switcher section 10 in the same manner as described above. Therefore, the switching circuit 11 is parallelly supplied with the video signals Sv respectively delivered from 8 TV cameras, 1 placed at different locations, the switching circuit 12 is parallelly supplied with the audio signals $S_A$ respectively delivered from 8 microphones 2, and the CPU 13 is parallelly supplied at its alarm input terminal with the detecting signals Ss respectively delivered from 8 sensors 3.

Figure 2:
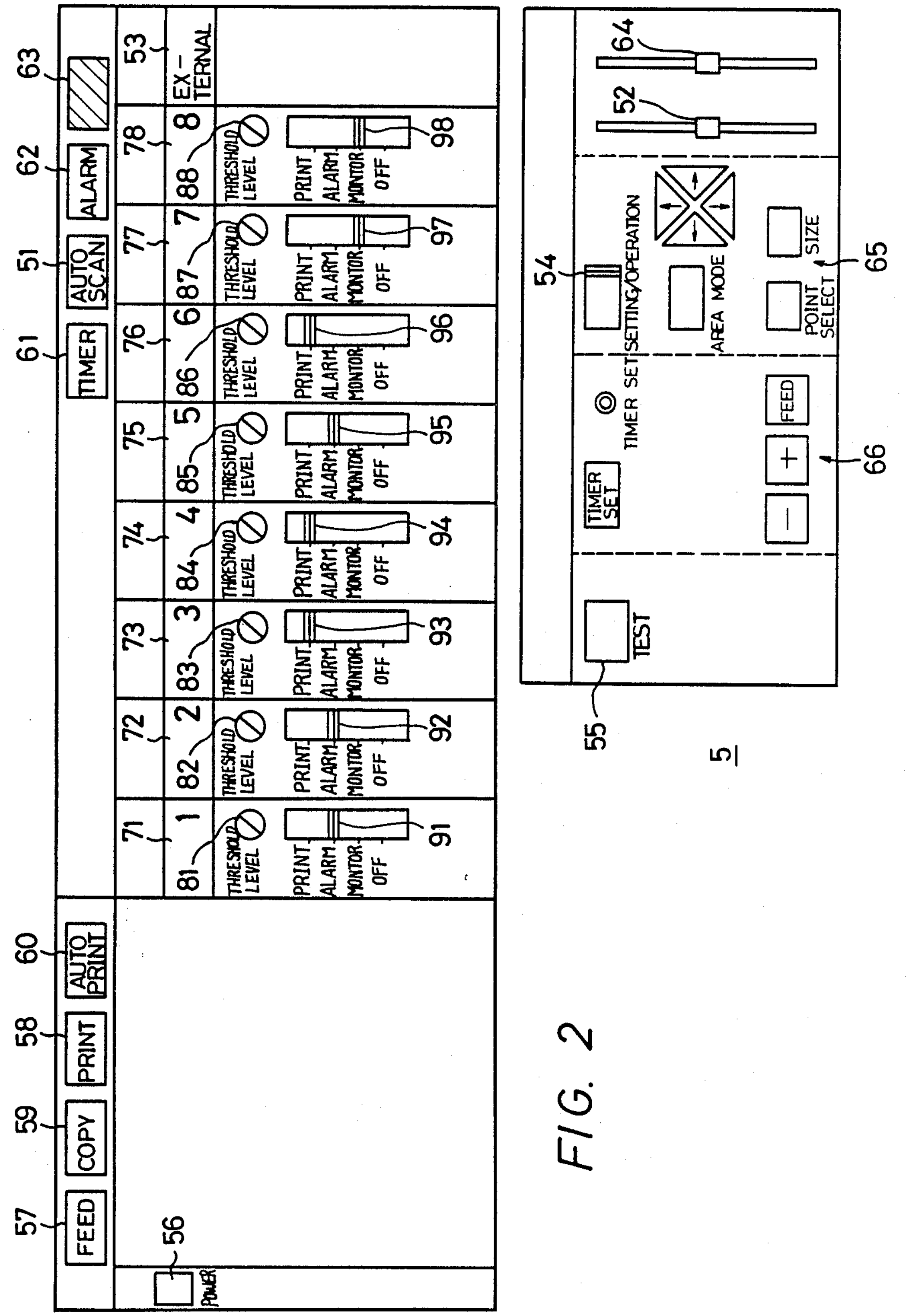
FIG. 2 is a diagram showing a control panel of the apparatus of FIG. 1.

A change-over of the switching circuits 11 and 12 is controlled by the CPU 13 according to the user's operation of a control panel 5. FIG. 2 shows the control panel 5. If one of a set of channel selecting switches 71–78 on the control panel 5 is selectively pressed, the switching circuits 11 and 12 are manually changed over to a selected channel. Further, when an automatic scanning switch 51 on the control panel 5 is pressed, the switches 11 and 12 are sequentially changed over to a different channel with a period set by sliding a scan speed setting lever 52 (e.g. 1–60 seconds). The channels sequentially changed over (auto scan channel) are selected as follows: First, the auto scan switch 51 is left in a pressed state, wherein the switching portions of the respective channel selecting switches 71–78 are repeatedly lit and extinguished. Then, the channel selecting switches 71–78 for channels which are required to sequentially be changed over are sequentially pressed to make the switching portions light. Thereafter, the auto scan switch 51 is released from the pressed state, whereby the channel corresponding to the lighting channel selecting switch is selected as an auto scan monitor channel.

It is not possible to select a channel whose function is set to an OFF state by a function selecting switch, as will be described later.

In FIG. 1, the video signal Sv outputted from the switching circuit 11 is supplied to an adder circuit 14. The adder circuit 14 is supplied with character signals representative of date, time, and channel generated by a character signal generator 15 under the control of the CPU 13, so that these character signals are added to the video signal Sv. Then, the composite video signal Sv with the character signals is supplied through a gate circuit 16 to a fixed terminal A of a change-over switch 17. The other fixed terminal B of the change-over switch 17 is supplied with a video signal Sv' from an external video signal input terminal 18V. One of the video signals Sv and Sv' selected by the change-over circuit 17 is supplied to a video signal output terminal 20V through an amplifier 19.

The audio signal $S_A$ outputted from the switching circuit 12 is supplied to a fixed terminal A of a change-over switch 21. To the other fixed terminal B of the change-over switch 21, there is supplied an audio signal $A_A'$ from an external audio signal input terminal 18A. One of the audio signals $S_A$ and $S_A'$ from the change-over switch 21 is supplied to an $S_A$ and SA audio signal output terminal 20A through an amplifier 22. The video signal and audio signal respectively outputted from the amplifiers 19 and 22 are also supplied to a monitoring apparatus 6.

The change-over switches 17 and 21 are controlled in their change-over by the CPU 13 according to the user's operation of the control panel 5. For example, the switches 17 and 21 are connected to the terminals A or B by pressing an external selection switch 53 shown in FIG. 2. When the switches 17 and 21 are respectively connected to their terminals A, an image by the video signal Sv is displayed on the screen of the monitoring apparatus 6, and a sound from the audio signal $S_A$ is generated from the loud speaker of the monitoring apparatus 6. On the other hand, when the switches 17 and 21 are respectively connected to their terminals B, an image by the video signal Sv' is displayed on the screen of the monitoring apparatus 6, and a sound from the audio signal $S_A'$ is generated from the speaker of the monitoring apparatus 6.

The video signal Sv from each of the 8 TV cameras is supplied through an adder circuit 23 to a digitizer circuit 31 and a synchronizing signal separating circuit 32 in an image processing circuit 30. A digital output signal $Sv_2$ produced by the digitizer circuit 31 is supplied to a switching circuit 33, and a synchronizing signal Ssync separated from the video signal Sv by the synchronizing signal separating circuit 32 is supplied to a switching circuit 34. The switching operation of the switching circuits 33 and 34 is controlled by the CPU 35.

Among the 8 channels, channels which are selected to be sequentially changed over are defined as sensing channels which means a channel in which a functional mode of PRINT or ALARM is selected. Such a selection of the function for each channel is made by function selecting sliding switches 91–98 arranged on the control panel 5, as shown in FIG. 2. The function PRINT is such that when a change in a scene is detected by the image processing section 30, an alarm is generated, and the image from the concerned channel is printed out. The function ALARM is such that when a change in a scene is detected by the image processing section 30, an alarm is generated. Further, when a function MONITOR is selected, the image processing section 30 does not detect changes in a scene as mentioned above, so that neither the alarm is generated, nor is the image of the concerned channel printed out. The change-over of the switching circuits 33 and 34 is effectd with a predetermined period, e.g. 1/30–1/60 second.

The video signal $Sv_2$ from the switching circuit 33 is supplied to a serial-to-parallel converting circuit 36 comprising e.g. a shift register. On the other hand, the synchronizing signal Ssync from the switching circuit 34 is supplied to an address comparator 37 wherein a location address is generated from the synchronizing signal Ssync and then compared with an assigned location address supplied to the address comparator 37 from the CPU 35. When the location address coincides with the assigned location address, a coinciding pulse $P_O$ is supplied from the address comparator 37 to the converting circuit 36 to halt a shifting operation effected by the converting circuit 36, and thereby data stored in the shift register is written into a RAM 38 at a predetermined address as parallel data, under the control of the CPU 35. The assigned location address from the CPU 35 is sequentially changed so as to write the data into the RAM 38. Reference data corresponding to the video signal $Sv_2$ when no change is detected in a scene, is previously stored in the RAM 38.

The operation described above is effected respectively for each of the sensing channels. The CPU 35 compares, for each of the sensing channels, the reference data with current data which is sequentially written into the RAM 38 afterward. If a change of more than a predetermined amount is detected, e.g. a 4-bit scene change alarm output signal $S_{AL}$ is delivered from the CPU 35. The 4-bit signal $S_{AL}$ consists of a 3-bit channel data and a 1-bit alarm data. The CPU 35 is operated by a program stored in a ROM 39.

The alarm signal $S_{AL}$ derived from the CPU 35 is supplied to an alarm input terminal of the CPU 13. When the CPU 13 is supplied with the alarm output signal $S_{AL}$, the CPU 13 delivers a signal Sc which drives an alarm generating circuit 24 comprising a buzzer or a lamp. The signal Sc is also supplied to an external alarm output terminal 25.

When the alarm output signal $S_{AL}$ is supplied to the CPU 13, the switching circuits 11 and 12 are changed over to the corresponding channel by the CPU 13, and the change-over circuits 17 and 21 are respectively forced to their terminals A by the CPU 13 if they previously were respectively connected to their terminals B. Then, the monitoring apparatus 6 displays on its screen an image reproduced from the image signal Sv supplied from the corresponding channel. Further, a printer trigger signal $S_{TR}$ is generated by the CPU 13 and supplied through a trigger control circuit 26 to a CPU 41 which is provided in a printer section 40. When the CPU 41 is supplied with the trigger signal $S_{TR}$, the memory control circuit 42 of the printer section 40 is controlled by the CPU 41 and the signal Sv from the corresponding channel is converted into a digital signal by an A/D converter 43, and then signals corresponding to one field of the converted signal Sv are written into a video memory 44, under the control of the memory control circuit 42. Then, data is sequentially read from the video memory 44, under the control of the memory control circuit 42, and then supplied to a printer head 45. At the same time, a printer motor 46 is driven, to print an image of the corresponding channel.

The video memory 44 comprises storage with a capacity e.g. of 4 field memories. Therefore, even when 4 trigger signals $S_{TR}$ are successively supplied to the CPU 41, one field of respective video signals Sv of the corresponding channel can be written into the video memory 44. When 4 field memories are all used and a current printing operation is not terminated, a printer busy signal $S_{PB}$ is generated by the CPU 41 and then supplied to the trigger control circuit 26, to inhibit the circuit so as not to supply the trigger signal $S_{TR}$ therefrom to the CPU 41.

The above description assumes that the CPU 13 is supplied with the alarm output signal $S_{AL}$. However, the same operation is effected when a change in a scene is detected by the detecting signal Ss.

It is necessary to set correctly a threshold value level $E_O$ for the digitizer circuit 31 in the image processing section 30 corresponding to a value of the level of the video signal Sv delivered from the TV camera 1 of each channel, in order that the image processing section 30 operates correctly. When the video signal Sv is at a level indicated by a solid line in FIG. 3A, the threshold value level $E_O$ may be set to an approximately middle value of a range of the video signal Sv as shown by a broken line in FIG. 3A. Then, the video signal $Sv_2$ delivered from the digitizer circuit 31 has a waveform as shown in FIG. 2B. The threshold value level $E_O$ is set for each of the channels, as is hereinafter explained.

First, a SETTING mode is selected by a sliding switch 54 on the control panel 5 shown in FIG. 2. At this time, the change-over circuits 17 and 21 are respectively connected to their terminals A under the control of the CPU 13 and the monitoring apparatus 6 is supplied with the video signal Sv through the gate circuit 16 to display an image reproduced from this video signal Sv on the screen thereof.

Next, a channel for which the threshold value level $E_O$ is set is selected by pressing one of the channel selecting switches 71–78. At this time, the switching circuits 11 and 12 in the switcher section 10 and the switching circuits 33 and 34 in the image processing section 30 are respectively changed over to the selected channel, under the control of the CPU 13.

Figure 3A:
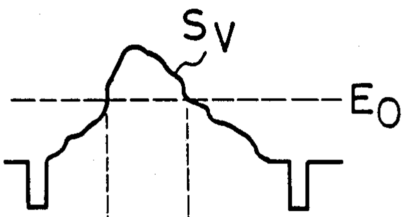
FIGS. 3A, 3B and 3C are waveform diagrams to explain how to set a threshold value level.
Figure 3B:
Figure 3C:
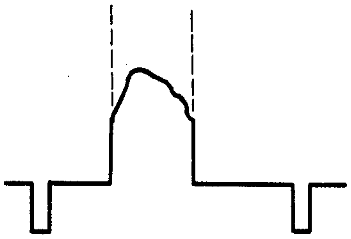

In the operation described above, the gate circuit 16 is controlled by the CPU 13 so as to gate the video signal Sv from the adder circuit 14 by the use of the digitized video signal $Sv_2$ derived from the switching circuit 33. For example, when the apparatus is operating in a normal condition, the gate circuit 16 is controlled such that it allows the video signal Sv delivered from the adder circuit 14 to pass therethrough unmodified. Therefore, when the video signal Vs from the adder circuit 14 has a waveform as indicated by the solid line in FIG. 3A while the video signal $Sv_2$ from the switching circuit 33 has a waveform as shown in FIG. 3B, the video signal Sv having a waveform as shown in FIG. 3C is outputted from the gate circuit 16 and supplied to the monitoring apparatus 6 which displays an image reproduced from such video signal Sv on the screen thereof.

Next, if the threshold value level $E_O$ for each channel is adjusted by rotating knobs 81–88, arranged on the control panel 5, for setting the threshold value $E_O$ for corresponding channels, the video signal $Sv_2$ is changed, which causes a change in the video signal Sv from the gate circuit 16, and thereby an image on the screen of the monitoring apparatus 6 is also changed. Thus, the operator adjusts the threshold value level $E_O$ as shown by the broken line in FIG. 3A, while monitoring the image on the screen of the monitoring apparatus 6. When the threshold value level $E_O$ is adjusted as shown in FIG. 3A, the image on the screen of the monitoring apparatus 6 is such that a bright portion and a dark portion substantially occupy a half of the entire image, respectively.

Then, if an OPERATION mode is selected by the sliding switch 54, the apparatus returns to the operating condition.

As described above, if a change is detected in an image delivered from a sensing channel, the alarm signal $S_{AL}$ is outputted from the image processing section 30 to generate an alarm from the alarm generating circuit 24, or the image from that channel is printed out. However, it is necessary to check or test whether the image processing section 30 is operating normally. According to the present embodiment, the surveillance apparatus is so constructed that the image processing section 30 can be manually or automatically checked.

A description will hereinafter be made as to how the image processing section 30 is manually checked. First, a test switch 55 on the control panel 5 is pressed, whereby a noise generating circuit 27 is activated by the CPU 13 and a noise $S_N$ generated therefrom is added by the adder circuit 23 to the video signals Sv delivered from the TV camera 1 of each of the respective 8 channels, and then the output signal from the adder circuit 23 is supplied to the digitizer circuit 31. Further, the switching circuits 11 and 12 in the switcher section 10 and the switching circuits 33 and 34 in the image processing section 30 are respectively changed over, with a predetermined cyclic period, sequentially from one of the sensing channels to another, in synchronism.

Adding the noise $S_N$ to the video signal Sv results in a quasi-change in a scene. Therefore, if the image processing section 30 is correctly or normally operating, the alarm output signal $S_{AL}$ should be outputted from the CPU 35, as described above. On the contrary, if the image processing section 30 is not correctly operating, the alarm output signal $S_{AL}$ is not outputted from the CPU 35.

Further, if the test switch 55 on the control panel 5 is pressed, the change-over switches 17 and 21 are respectively connected to their terminals A under the control of the CPU 13. Also, every time each of the sensing channels is sequentially changed over, the CPU 13 supplies the printer trigger signal $S_{TR}$ through the trigger control circuit 26 to the CPU 41 of the printer section 40, and the character signal generating circuit 15 generates, in addition to character signals representative of the date, time and channel, character signals representative of "OK" when the alarm signal $S_{AL}$ is outputted, or character signals representative of "NG" when the alarm signal $S_{AL}$ is not outputted. The character signals are added to the video signal Sv by the adder circuit 14. Therefore, corresponding to each of the sensing channels, the monitoring apparatus 6 displays an image with "OK" or "NG" superimposed thereon, and the printer section 40 prints the image with "OK" or "NG" superimposed thereon. When the above-mentioned checking operation is terminated for all of the sensing channels, the apparatus returns to the normal operating condition.

If "NG" is displayed, the image processing section 30 is not correctly operating for the corresponding channel, so that the threshold value level $E_O$ for this channel, applied to the digitizer circuit 31, is to be set again in the same manner as described above.

On the other hand, as to the automatic test, the same operation as the above-mentioned manual test is automatically effected at a predetermined time interval, e.g. 10 days.

Figure 4:
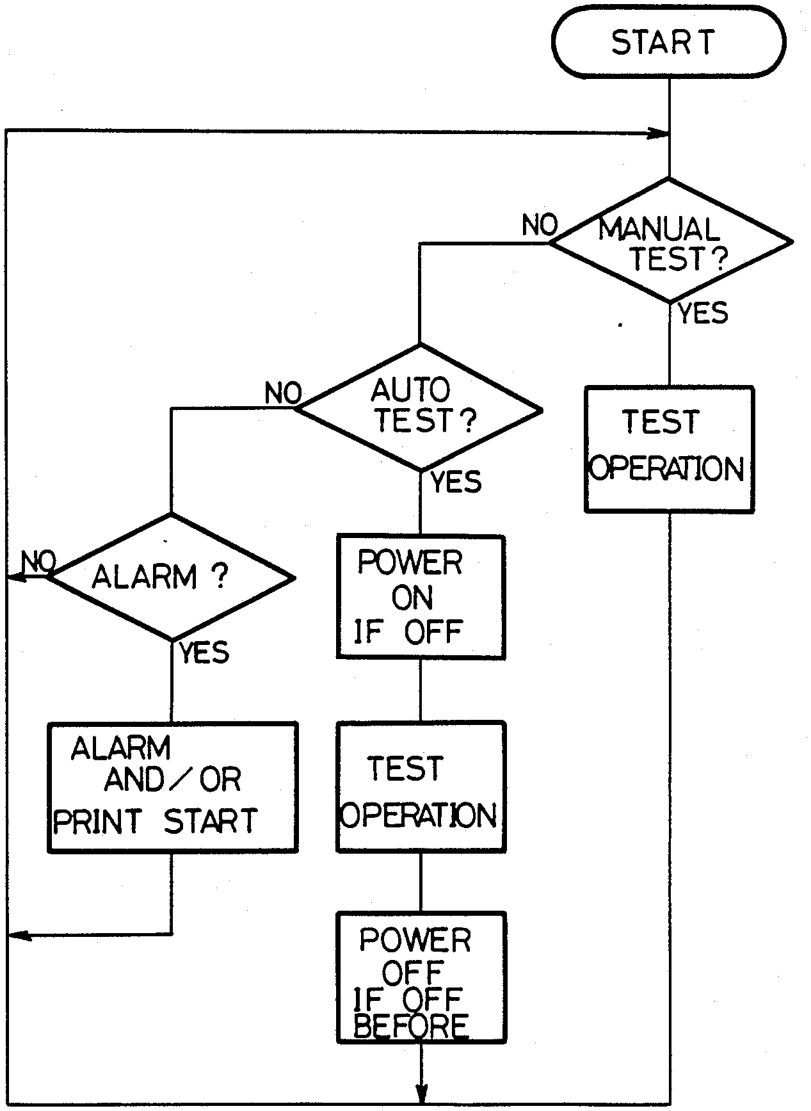
FIG. 4 is a flow chart showing a test operation of the surveillance apparatus of FIG. 1.

FIG. 4 is a flow chart generally showing the operation effected by the embodiment of the present invention shown in FIG. 1, including the above-mentioned manual and automatic tests. When the embodiment of the surveillance apparatus as shown in FIG. 1 is operating with a timer, it may be that the power supply is turned off at the time the automatic test is about to start. For this case, the power supply is turned on before the automatic test starts and again turned off when the automatic test is completed, as shown in FIG. 4.

Figure 5:
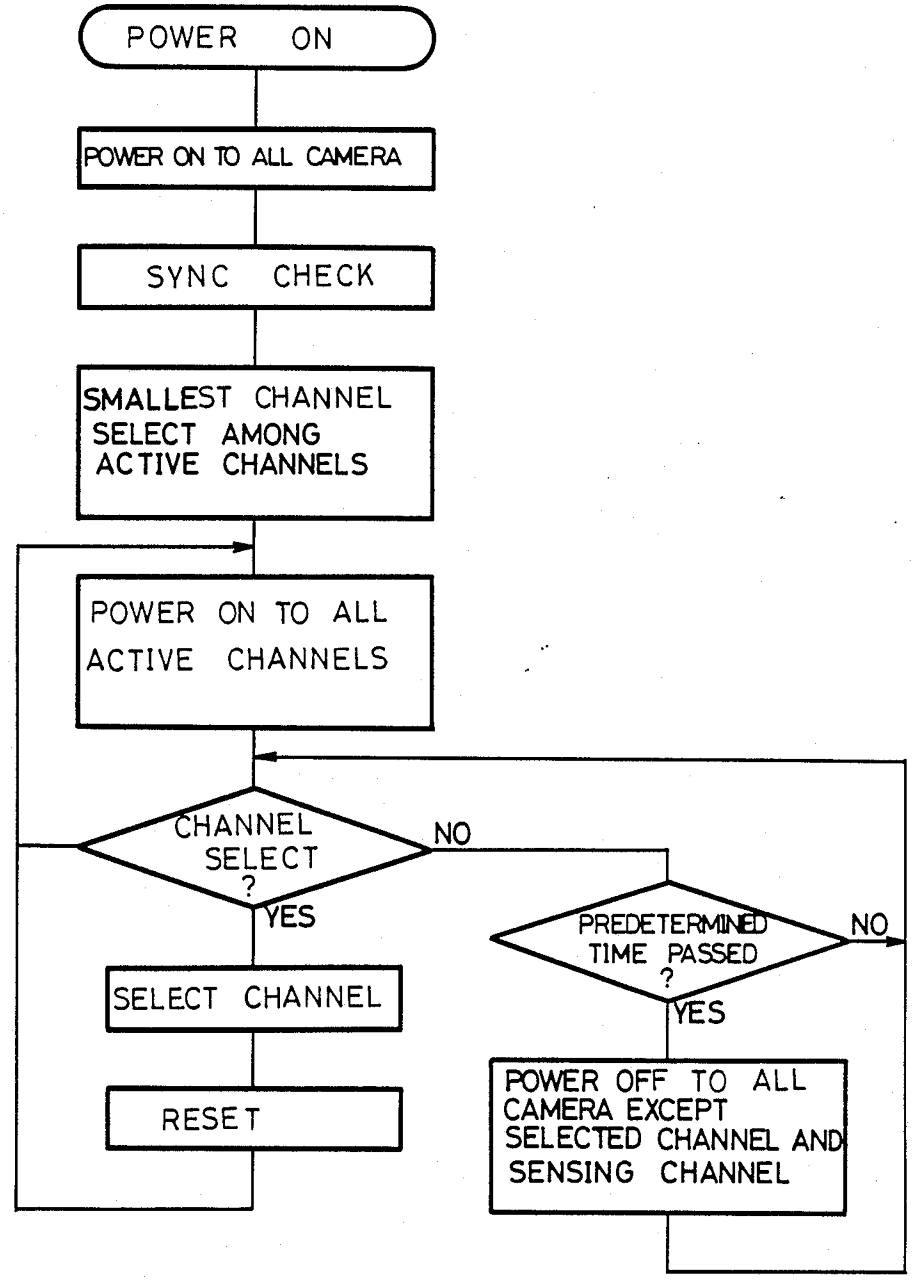
FIG. 5 is a flow chart showing a power supply control function in a manual mode.

Referring again to FIG. 1, reference numeral 7 designates a power supply circuit which supplies the required electric power to the switcher section 10, the image processing section 30 and the printer section 40. The TV cameras 1 in the 8 channels are supplied with the electric power through a power supply control circuit 28 arranged in the switcher section 10. The power supply control circuit 28, controlled by the CPU 13, controls the power supply to the TV cameras 1 in the 8 channels as follows: When the power supply is turned on, all the TV cameras 1 in the 8 channels are supplied with the electric power. Then, it is determined whether or not there is a channel in which the TV camera is not connected, by checking the presence of the synchronizing signal. Next, the electric power is supplied to the TV cameras 1 of all the channels which are not left in the OFF mode by the function selecting switches 91-98 and have the TV camera 1 connected therewith, and simultaneously the channel having the last number is determined as the selected channel (manual mode). If one of the channel selecting switches 71-78 is not pressed within a predetermined time period, e.g. 30 seconds under this state, the power supply is halted for the TV cameras 1 except for those arranged in the channel having the lowest number of the sensing channels. On the other hand, if one of the channel selecting switches 71-78 is pressed within the predetermined time period, the measured time is cleared and the time is started to be measured again from the time at which the switch is pressed. If one of the channel selecting switches 71-78 is not pressed within a predetermined time period, e.g. 30 seconds, under this state, the power supply is halted for the TV cameras 1 except for those arranged in the channel having the lowest number of the sensing channels. If one of the channel selecting switches 71-78 is pressed after the predetermined time period has elapsed, the electric power is again supplied to the TV cameras 1 of all the channels which are not left in the OFF mode by the function selecting switches 91-98 and have the TV camera 1 connected therewith, and the operation similar to that mentioned above is carried out. FIG. 5 is a flow chart showing the above-described operation.

Figure 6:
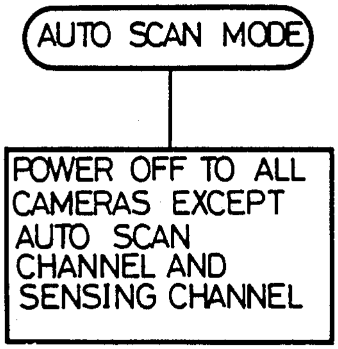
FIG. 6 is a flow chart showing a power supply control function in an auto scan mode.

When the auto scan switch 51 is pressed (the auto scan mode), the power supply is halted for the TV cameras 1 except for those in the auto scan channel and sensing channels. FIG. 6 is a flow chart showing this operation.

The monitoring apparatus 6 is supplied with the electric power from the power supply control circuit 28.

Now, referring again to FIG. 2 showing the control panel 5, reference numeral 56 designates a power supply switch, 57 a switch for feeding the printer section 40 with a paper on which images are printed, 58 a switch for printing an image reproduced from the video signal then supplied to the printer section 40, 59 a switch for printing an image reproduced from the video signal stored in the video memory 44, 60 a switch for turning on and off the automatic printing function at the time the alarm signal $S_{AL}$ is outputted or the like, 61 a switch for turning on and off the timer operation, 62 a switch for turning on and off the alarm generating circuit 24, 63 a light emitting diode which constitutes the alarm generating circuit 24, 64 a lever for adjusting e.g. a volume of the buzzer, which also constitutes the alarm generating circuit 24, 65 a group of switches for determining a range in which changes in scene are detected, and 66 a group of switches for setting the time of the timer.

As described above, according to the present embodiment, it is automatically checked once at predetermined intervals, e.g. 10 days, whether or not the image processing section 30 is operating normally, so that complete operations of the image processing section 30 can be assured, rendering it possible to provide a surveillance apparatus with a high accuracy. Further, while the image processing section 30 is thus automatically checked, the printer section 40 is in operating condition. Therefore, the printer section 40 is also checked simultaneously whether or not it is operating normally, which is another advantage of the invention.

Further, according to the present embodiment, users can freely set the change-over cyclic period of the switching circuits 11 and 12 of the switcher section 10 by the operating knob 52 on the control panel 5, independently of the change-over cyclic period of the switching circuits 33 and 34 of the image processing section 30, which gives facility in operation to users. When the alarm signal $S_{AL}$ is outputted from the image processing section 30, the switching circuits 11 and 12 are respectively changed over to a corresponding channel, and the monitoring apparatus 6 displays an image from this channel on its screen, so that no problem will occur as a result of abnormal conditions of these switches.

Furthermore, according to the present embodiment, the electric power supplied to the TV cameras 1 is controlled by the power supply controlling circuit 28 so as to halt the power supply to unused TV cameras, which results in largely reducing the power consumption as well as prolonging the effective life of the TV cameras 1, and particularly the image pick-up devices arranged therein.

Still further, in the manual mode, all the TV cameras 1 are supplied with electric power for a predetermined period of time, e.g. 30 seconds. Therefore, if one of other channels is selected within this predetermined period of time, the image on the screeen can be prevented from deterioration due to initial unstable conditions and so on, whereby users will not suffer the unpleasant viewing of initial conditions.

The above description is based on a single preferred embodiment of the invention, but it will be apparent that many modifications and variations could be effected by one skilled in the art without departing from the spirit or scope of the novel concepts of the invention so that the scope of the invention should be determined by the appended claims only.

We claim as our invention:

1. A surveillance system having self-test functions, comprising, in combination:

image pick-up means;

manually adjustable threshold setting means for adjustably setting a threshold level;

image processing means connected to said image pick-up means for detecting a scene change represented by a change in that portion of video signals obtained from said image pick-up means which exceeds the threshold level set by said threshold setting means;

alarm means connected to said image processing means for generating alarm signals in response to detection of a scene change; and self-test means including a generator of noise signals and means for superimposing said noise signals on said video signals to be supplied to said image processing means as quasi-scene change information, whereby the operability of the threshold level set by said threshold setting means is verified by operation of said alarm means.

2. A surveillance system as claimed in claim 1, wherein said self-test means further includes timer means, and means for controlling the superimposing of said noise signal on said video signals at predetermined times, in response to operation of said timer means.

3. A surveillance system as claimed in claim 2, further comprising a printing system which prints images of said video signals in response to detection of said scene change by said image processing means.

4. A surveillance system as claimed in claim 1, wherein said image pick-up means includes a plurality of TV cameras, switching means for cyclically selecting different ones of said cameras to supply video signals to said image processing means at predetermined times.

5. A surveillance system as claimed in claim 4, wherein said noise signals are superimposed on the video signals of each of said TV cameras, and wherein said switching means includes means to select cyclically one of noise-superimposed video signals.

* * * * *